US006672414B2

(12) United States Patent
Laflamme

(10) Patent No.: US 6,672,414 B2
(45) Date of Patent: Jan. 6, 2004

(54) HYDRAULIC PUMP FOR AN ATV

(75) Inventor: Martin Laflamme, Pintendre (CA)

(73) Assignee: Bombardier Inc., Valcourt (CA)

( * ) Notice: Subject to any disclaimer, the term of this patent is extended or adjusted under 35 U.S.C. 154(b) by 54 days.

(21) Appl. No.: 09/880,022

(22) Filed: Jun. 14, 2001

(65) Prior Publication Data

US 2002/0015646 A1 Feb. 7, 2002

Related U.S. Application Data

(60) Provisional application No. 60/213,553, filed on Jun. 23, 2000.

(51) Int. Cl.[7] ........................ B60K 17/28; B60K 25/02; F04B 17/05

(52) U.S. Cl. .................. 180/53.4; 417/364; 123/198 C; 74/15.63

(58) Field of Search ............................... 180/53.4, 53.8; 417/364, 360; 123/198 C; 74/15.63

(56) References Cited

U.S. PATENT DOCUMENTS 3,522,861 A * 8/1970 Middlesworth et al. .... 180/53.4
3,643,642 A * 2/1972 Junes ..................... 123/198 C
3,781,137 A * 12/1973 Engstrom ................... 417/364
4,479,395 A * 10/1984 Riley ........................ 74/15.84
4,577,712 A 3/1986 Foote et al.
6,178,668 B1 1/2001 Gustafson et al.

FOREIGN PATENT DOCUMENTS

CA 2197054 8/1998
EP 0 569 250 A2 * 11/1993

* cited by examiner

*Primary Examiner*—Peter C. English
(74) *Attorney, Agent, or Firm*—Pillsbury Winthrop LLP

(57) ABSTRACT

An ATV includes a frame, a power unit and a hydraulic pump unit. The power unit is mounted on the frame for propulsion of the ATV. The power unit has an output shaft and a mounting structure. A hydraulic pump unit includes an assembly casing mounted to the mounting structure of the power unit. A hydraulic pump is mounted to the assembly casing. The hydraulic pump has a rotatable input shaft and a shaft extension coupled to the output shaft. The shaft extension is carried by the assembly casing so as to be coaxial with the output shaft. A coupling structure or coupler couples the shaft extension to the input shaft.

37 Claims, 14 Drawing Sheets

HYDRAULIC PUMP FOR AN ATV

CROSS REFERENCE TO RELATED APPLICATIONS

The present application claims priority to U.S. Provisional Application No. 60/213,553 filed Jun. 23, 2000, the entirety of which is hereby incorporated into the present application by reference.

BACKGROUND OF THE INVENTION

1. Field of the Invention

The present invention relates to hydraulic pump assemblies. In particular, the invention relates to a hydraulic pump unit that may be retrofitted to or provided on an all-terrain vehicle (ATV).

2. Description of Related Art

Various ATVs have been designed primarily for sports and leisure riding. Typically, such ATVs include a frame and an engine mounted on the frame to power the wheels and propel the ATV. The frame may have three or more wheels operatively couple thereto.

In recent years, there has been a desire to use such ATVs for work-related purposes such as lawn-mowing, snow removal, or forestry. To convert ATVs into work vehicles, various accessories (for example snow blowers, snow plows, lawn mowers, log splitters, etc.) have been designed for attachment to such ATVs and are presently available. Unfortunately, these accessories have a significant drawback in that two engines, one for propelling the vehicle and one for driving the accessory, are generally required, thus making such systems expensive. For example, U.S. Pat. No. 6,178,668 discloses a snow blower accessory that utilizes a first engine to power the vehicle and a second engine to power the snow blower.

To eliminate the need for a second engine, various mechanisms have also been developed that use the ATV's engine to both propel the vehicle and power the accessory.

U.S. Pat. No. 4,577,712 discloses a hydraulic pump assembly that connects to the ATV's engine to provide hydraulic power for accessories. The hydraulic pump is mounted to the ATV's frame forward of the ATV's engine. Rotation is transferred from the crankshaft through the ATV's centrifugal clutch and then to a manually operable hydraulic pump clutch. The rotational output of the hydraulic pump clutch is then transferred via a chain drive to the input shaft of the hydraulic pump. The hydraulic fluid discharged under pressure by the hydraulic pump then flows through a hydraulic circuit to power the hydraulic motor of an accessory such as a lawn mower. Because of the complexity of the hydraulic clutch and chain drive system, the disclosed hydraulic pump assembly is expensive, and requires significant modification of the ATV. The modifications generally relate to the engine, e.g., an extra shaft and clutch are required and holes must be provided in the engine case of the ATV for the chain. Additionally, the hydraulic clutch cannot draw maximum available power from the engine.

Canadian laid open Patent Application No. 2,197,054 (the '054 application) discloses another way of using the existing engine of an ATV to drive a hydraulic pump assembly to power an accessory. ATVs typically have auxiliary starter units (e.g., hand pull starters) that mount directly to the engine's crankshaft. The hydraulic pump assembly disclosed in the '054 application is mounted to the engine within an auxiliary starter casing in place of the auxiliary starter recoil. The input shaft of the hydraulic pump is generally coaxial with the crankshaft of the engine. The pump assembly uses a joint mechanism, e.g., a polymeric joint, in which the pump's input shaft engages the crankshaft of the engine. However, because the joint members are carried on separate shafts, for example, each is cantilevered with respect to the other, vibrations, chatter, and relative radial movement develop between the joint members despite the presence of the polymeric joint. In most conventional ATVs, the crankshaft bearings are not designed to support additional load or to sustain relative movement, thereby causing damage to the engine and a shorter life for the engine, which are generally inefficient and undesirable. Another drawback of conventional hydraulic pumps, e.g., such as the hydraulic pump disclosed in the '054 application, the joint mechanism does not allow the drawing of maximum available power from the engine.

Accordingly, a need has developed in the art to provide a hydraulic pump unit that addresses one or more of the drawbacks described above.

SUMMARY OF THE INVENTION

It is therefore an aspect of the present invention to provide a hydraulic pump unit that is simple, functional, and inexpensive.

Another aspect of the invention is to provide gears that enable the hydraulic pump unit to increase the available power drawn from the power unit or from the engine.

Another aspect of the invention is to provide a hydraulic pump unit that can be retrofitted to an existing ATV without requiring modification of the ATV or additional engine parts or fittings. For example, the hydraulic pump unit can be mounted on the engine in replacement of an auxiliary starter that would normally be mounted on the engine.

Yet another aspect of the invention is to provide an ATV provided with a hydraulic pump unit as described above.

According to one preferred embodiment of the present invention, an ATV including a frame, a power unit, and a hydraulic pump unit. The power unit is mounted on the frame for propulsion of the ATV. The power unit has an output shaft and a mounting structure. A hydraulic pump unit includes an assembly casing mounted to the mounting structure of the power unit. A hydraulic pump is mounted to the assembly casing. The hydraulic pump has a rotatable input shaft and a shaft extension coupled to the output shaft. The shaft extension is carried by the assembly casing so as to be coaxial with the output shaft. A coupler couples the shaft extension to the input shaft.

In another preferred embodiment of the present invention, a hydraulic pump unit comprises an assembly casing, a hydraulic pump, a shaft extension and a coupler. The assembly casing is adapted to be removably mounted to power unit mounting structure. The hydraulic pump is mounted to the assembly casing and has a rotatable input shaft. The shaft extension is carried by the assembly casing so as to be coaxial with an output shaft of a power unit. The coupler which may be carried by the shaft extension couples the shaft extension to the input shaft.

In yet another preferred embodiment of the present invention, a hydraulic pump unit that is retrofitted onto an ATV, for example, in replacement of an auxiliary starter operatively coupled to the ATV. The hydraulic pump unit comprises a casing having a shaft extension. The shaft extension is provided with a first gear and a hydraulic pump has a second gear that meshes with the first gear. A first coupling member is supported on the shaft extension. A second coupling member has a first end attachable to an engine crankshaft and a second end that is selectively coupleable with the first coupling member. The second coupling member is at least partially supported on the shaft extension.

Because at least a portion of each of the first and second coupling members is carried by the shaft extension such that neither coupling members can move radially relative to the shaft extension, the coupling members are also prevented from moving radially relative to each other. Consequently, the vibrations and relative radial movement that plagued the hydraulic pump assembly disclosed in the '054 application are prevented in the hydraulic pump unit according to the present invention.

A method of retrofitting a hydraulic pump unit onto an ATV is also provided. The method comprises removing at least a portion of an auxiliary starter to expose an output shaft of the power unit. Providing a hydraulic pump unit including a casing having a shaft extension provided with a first gear and a hydraulic pump having a second gear that meshes with the first gear. Coupling the hydraulic pump unit to the output shaft of the ATV.

These and other aspects of the invention will be described in or apparent from the following detailed description of preferred embodiments.

BRIEF DESCRIPTION OF THE DRAWINGS

For a better understanding of the present invention as well as other aspects and further features thereof, reference is made to the following description which is to be used in conjunction with the accompanying drawings, wherein.

DETAILED DESCRIPTION OF PREFERRED EMBODIMENTS

FIGS. 1–8 and 10 illustrate an ATV, generally indicated at 10, and a hydraulic pump unit, generally indicated at 20, according to the present invention having one gearing/shaft arrangement for the hydraulic pump unit 20. FIG. 11 illustrates a coupling actuator 140 of the hydraulic pump unit 20. FIGS. 9 and 12–14 illustrate alternative gearing/shaft arrangements for the hydraulic pump unit 20.

Figure 1:
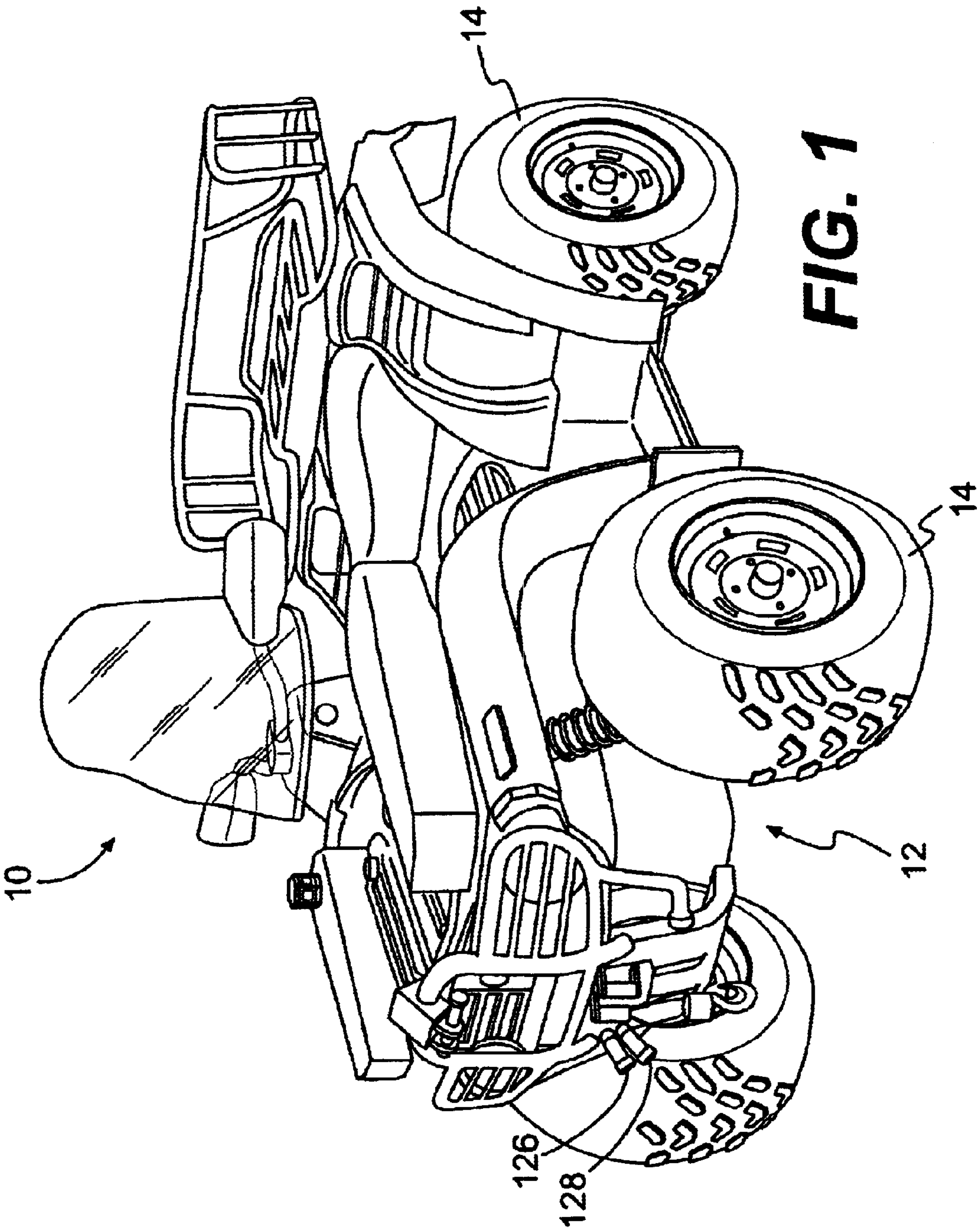
FIG. 1 is a perspective view of an ATV according to one preferred embodiment of the present invention.

As best seen in FIG. 1, the ATV 10 includes a frame 12 having four wheels 14. While a four-wheel ATV is illustrated, the invention would work equally well in a three-wheel ATV or any other type of off road vehicle or work vehicle.

Figure 2:
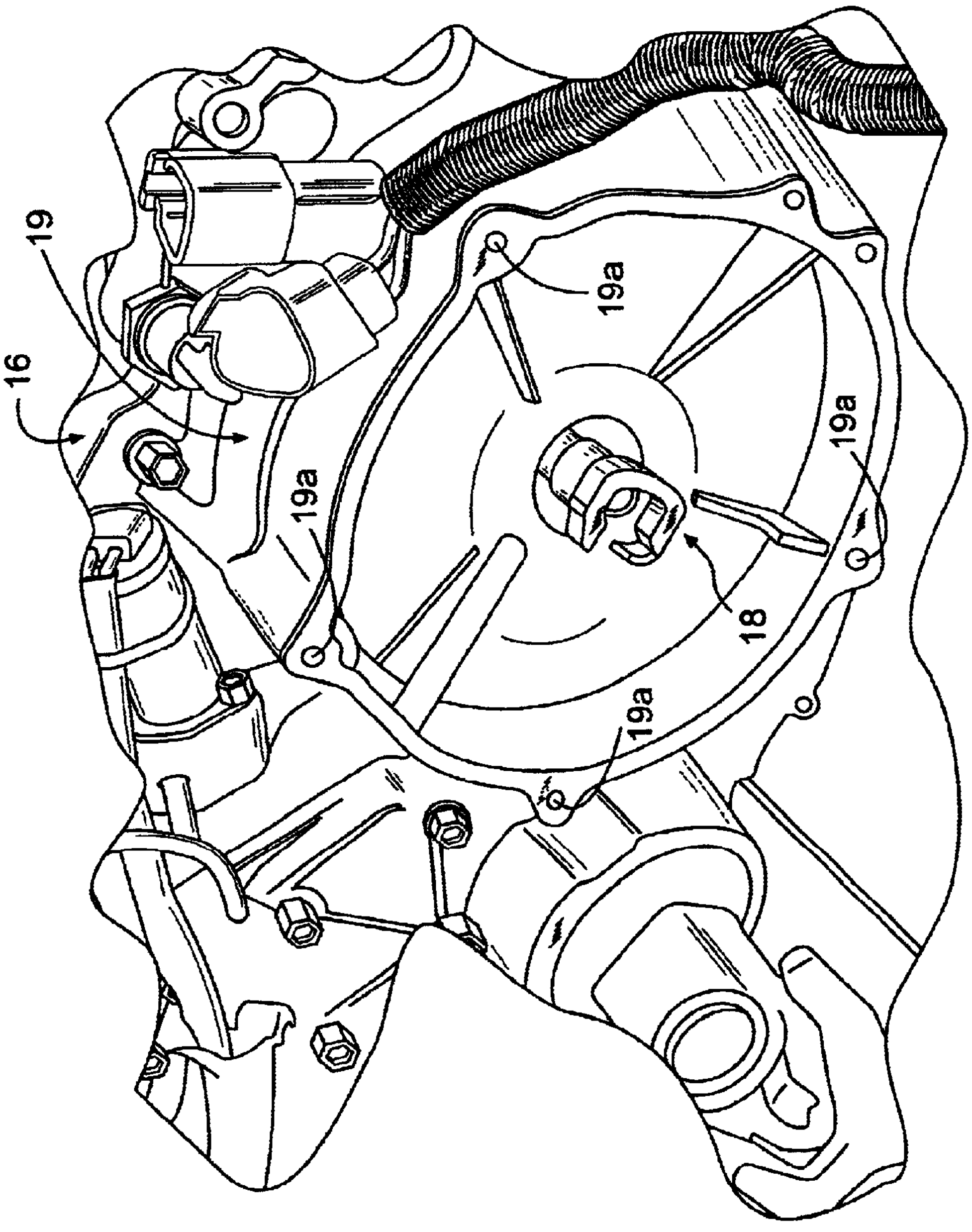
FIG. 2 is a partial perspective view of an engine of the ATV shown in FIG. 1, without the hydraulic pump unit.
Figure 3:
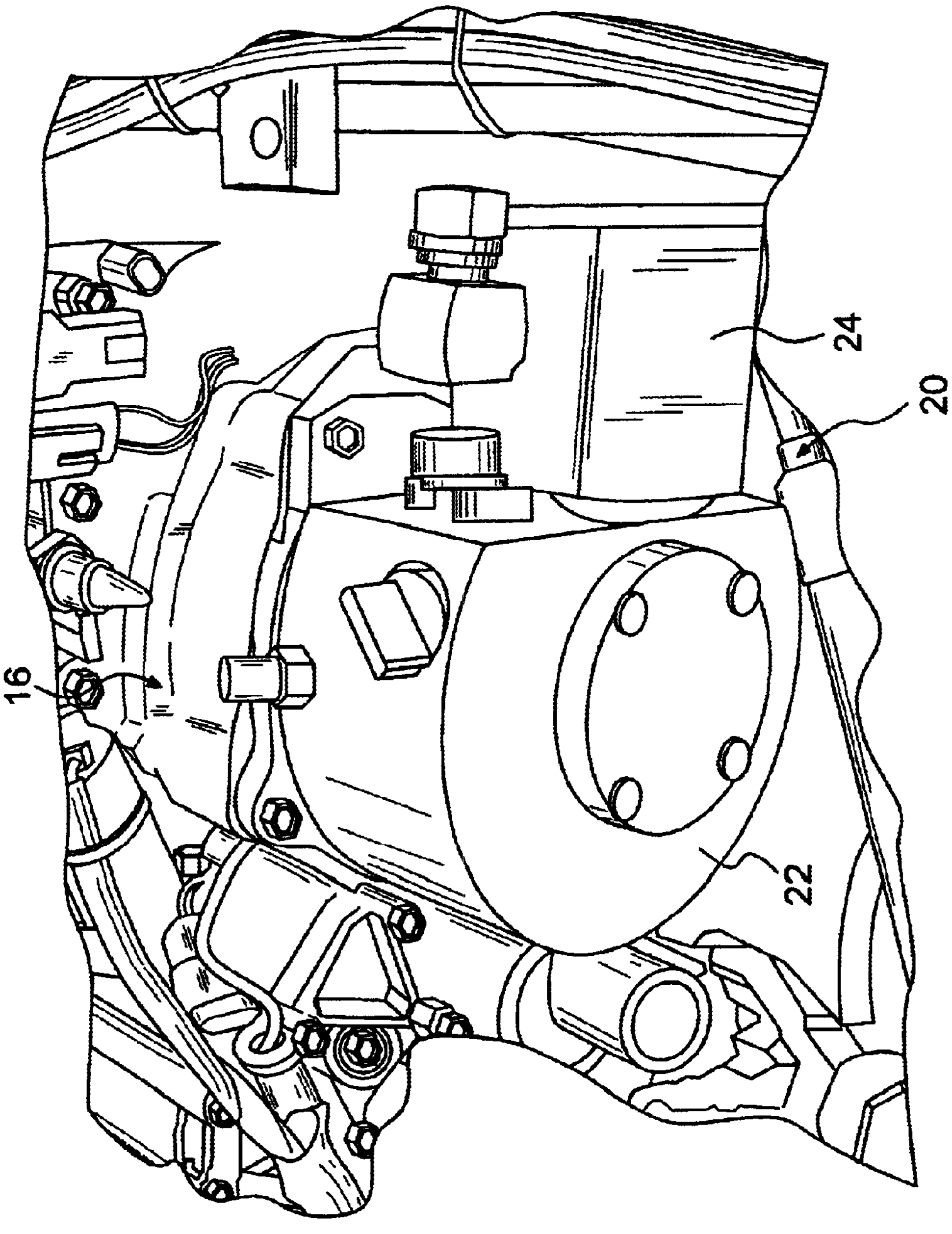
FIG. 3 is a partial perspective view of the engine of the ATV shown in FIG. 1, with the hydraulic pump unit mounted to the engine.

FIGS. 2 and 3 are partial perspective views of an engine 16 of the ATV 10 shown in FIG. 1. The engine 16 has an output shaft in the form of a crankshaft 18. The crankshaft 18 is surrounded by a mounting structure 19. In the illustrated embodiment, the mounting structure 19 is designed to accommodate an auxiliary starter (not shown), as is conventional. The auxiliary starter has been removed in this figure so that the hydraulic pump unit 20 of the present invention can be mounted on the mounting structure 19. The mounting structure 19 may include a flanged section with a number of bolt-receiving holes 19*a*. Because engines for ATVs are typically provided with standard auxiliary starter mounting structures, typical commercially available ATVs can easily be retrofitted with the hydraulic pump unit 20 according to the present invention.

The hydraulic pump unit 20 need not replace an auxiliary starter and can be mounted to any portion of the ATV 10, e.g., the engine 16. The hydraulic pump unit 20 can replace components other than the auxiliary starter and can be mounted onto the engine 16, for example. The auxiliary starter, for example, could be mounted inside the hydraulic pump unit 20, external to the hydraulic pump unit 20 or adjacent to the hydraulic pump unit 20, such as, on top of the hydraulic pump unit 20. Alternatively, the auxiliary starter could be mounted to an assembly casing 22, which is described in greater detail below.

More generally, the hydraulic pump unit 20 can be mounted onto any power unit in other manners so long as the pump unit 20 has access to an output shaft of the power unit, e.g., the crankshaft 18 of the engine 16. The configuration of the mounting structure 19 can be altered depending on the mounting position of the hydraulic pump unit 20. For example, if the hydraulic pump unit 20 is mounted inside the power unit to a mounting structure, that mounting structure will have a different configuration than mounting structure 19 when the hydraulic pump unit 20 is mounted external to the power unit. The power unit may, at least conceptually, include an engine, a transmission and an output shaft that is accessible to the hydraulic pump unit 20. The output shaft may be, for example, either an output shaft of the engine or an output shaft of the transmission.

As best seen in FIG. 3, the hydraulic pump unit 20 is mounted to the engine 16. For the sake of clarity, the hydraulic pump unit 20 is described as being coupled to the engine 16, although other mounting configurations are possible. The assembly casing 22 is bolted to the mounting structure 19 of the engine 16, for example, through bolt-receiving holes 19*a*. The assembly casing 22 can also be positioned partially external to the engine 16 with a portion thereof positioned within the engine 16, rather than being positioned entirely external to the engine 16. Another assembly casing may be provided to position the hydraulic pump unit 20 entirely inside the engine 16. A hydraulic pump 24 is mounted to or integral with the assembly casing 22. The hydraulic pump 24, together with the crankshaft 18, could at least in part, constitute a portion of the hydraulic pump unit 20, for example.

Figure 4:
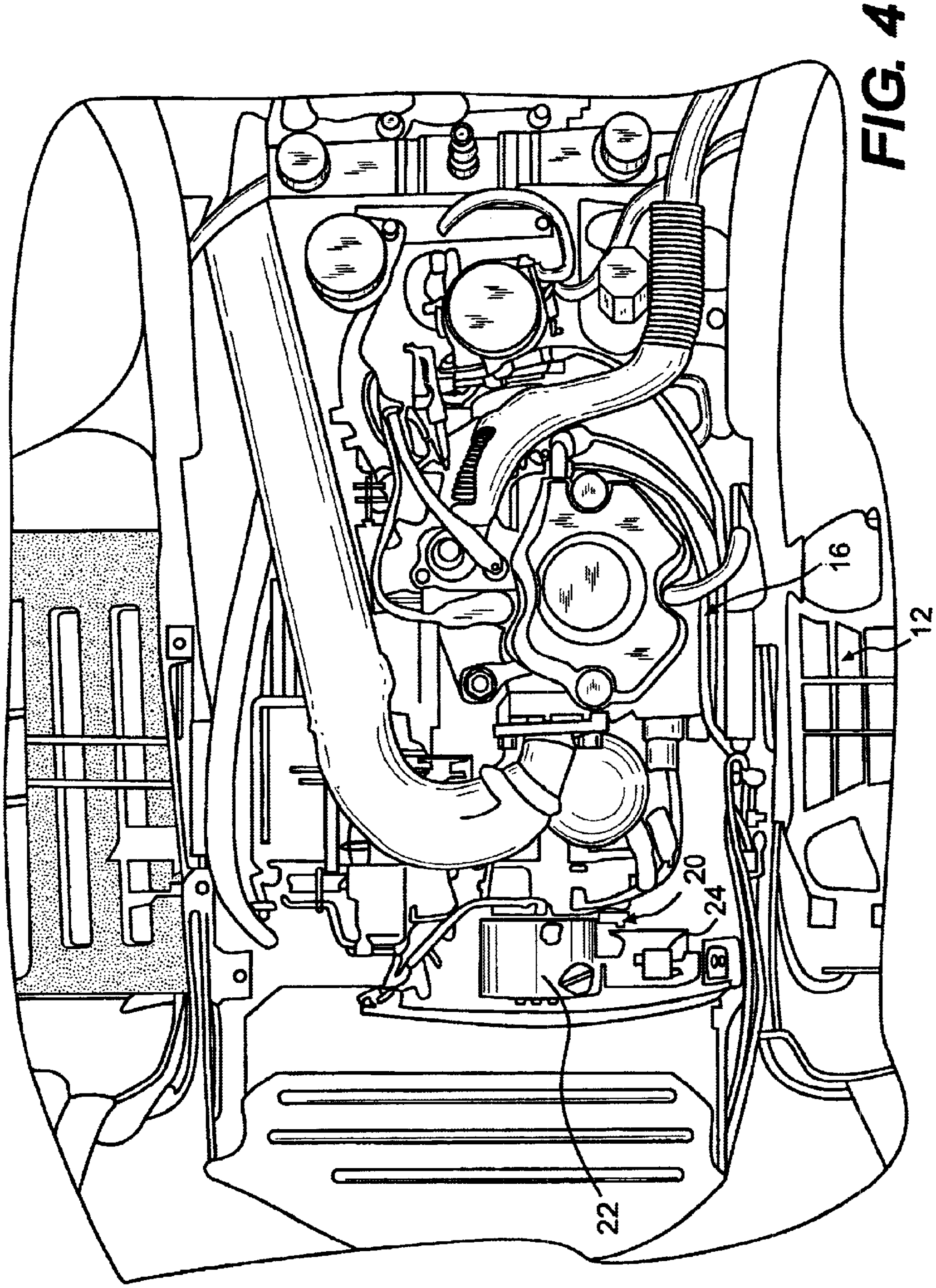
FIG. 4 is a top plan view of the engine and engine compartment of the ATV shown in FIG. 1, with the hydraulic pump unit.

FIG. 4 is a partial top plan view of the ATV 10 with the seat removed or in the up position. The engine 16 is mounted on the frame 12 and is operatively connected to at least one of the wheels 14 (FIG. 1) to propel the ATV 10. The hydraulic pump unit 20 is mounted to the crankshaft 18 (FIG. 2) of the engine 16.

Figure 5:
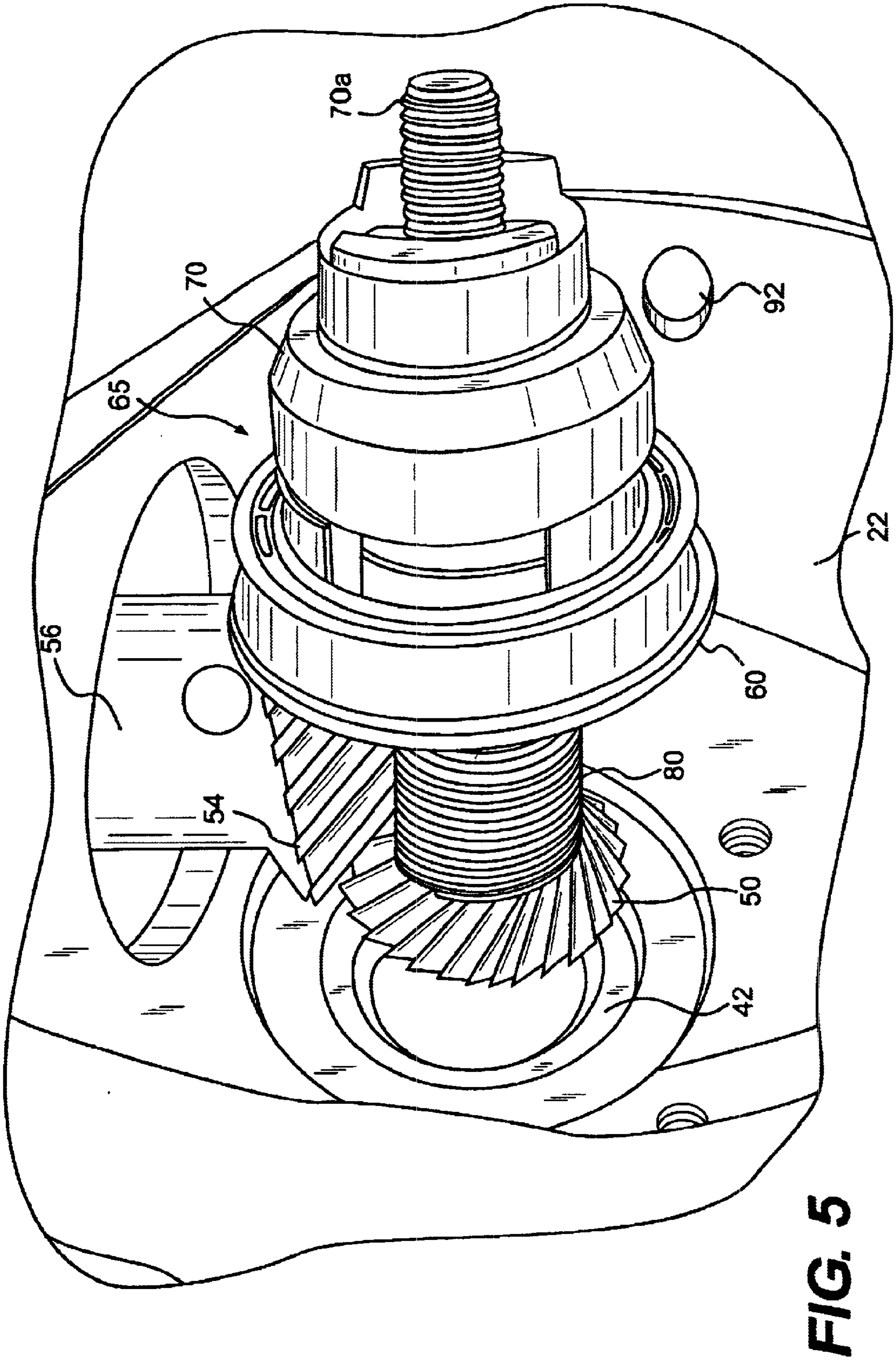
FIG. 5 is a partial perspective view of the hydraulic pump unit.
Figure 6:
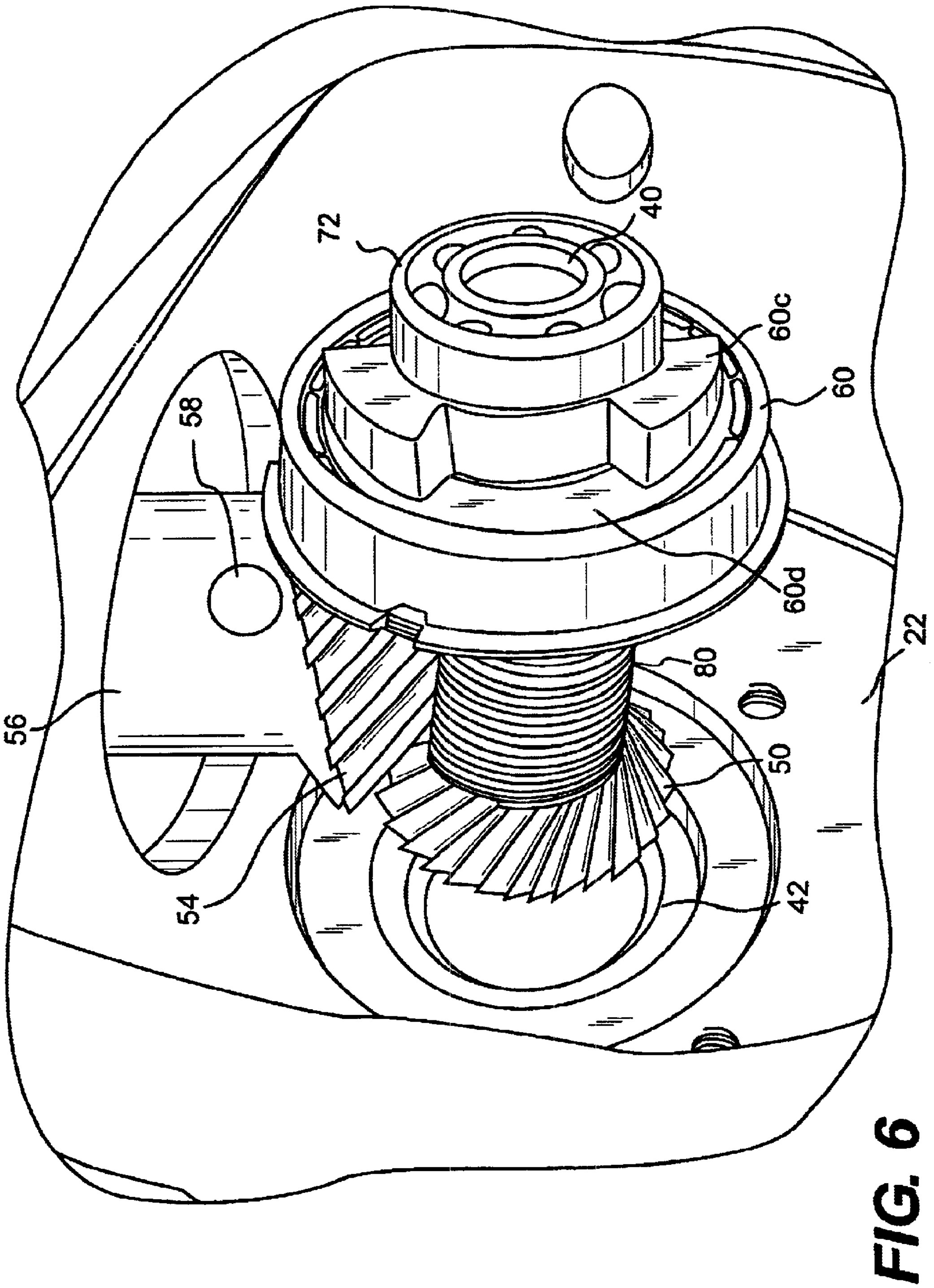
FIG. 6 is a partial perspective view of the hydraulic pump unit, without the second coupling member.

The hydraulic pump unit 20 is best seen in FIGS. 3–8. FIGS. 5 and 6 show the assembly casing 22 carrying a shaft extension 40 such that the shaft extension 40 is coaxial with the crankshaft 18 of the engine 16 when the hydraulic pump unit is mounted to the engine 16. The manner in which the shaft extension 40 is carried could be effected by a carrying structure 42 (FIGS. 5 and 6). The carrying structure 42 is disposed between the shaft extension 40 and the assembly casing 22 to permit the shaft extension 40 to rotate freely without any substantial radial or axial movement. The carrying structure 42 could be a rotational bearing, a bushing or some other carrying structure configured to carry the shaft extension 40 coaxially with the crankshaft 18, for example. Alternatively, the shaft extension 40 can be integrally formed or co-extensive with the crankshaft 18, for example. The shaft extension 40 could also be mounted to the auxiliary starter in an alternative embodiment not shown.

The shaft extension 40 carries a shaft gear 50. As shown in FIG. 8, the shaft gear 50 is fixedly mounted to the shaft extension 40 via, e.g., a hex screw 52, to prevent axial, radial, or rotational movement with respect to the shaft extension 40. A spline or key 62 (FIG. 7) on the shaft extension 40, which will be described later, fits into a key way (not shown) on the shaft gear 50 to prevent the shaft gear 50 from rotating relative to the shaft extension 40.

A pump gear 54 is rotatably fixed to the input shaft 56 of the hydraulic pump 24 via a hex screw 58 such that the pump gear 54 meshes with the shaft gear 50. The hex screw 58 prevents the pump gear 54 from axial, radial, or rotational movement with respect to the input shaft 56. Alternatively, a spline or key could be provided on the input shaft 56 to fit into a key way on the pump gear 54 to prevent the pump gear 54 from rotating relative to the input shaft 56. Because the input shaft 56 is mounted perpendicularly to the shaft extension 40 in this embodiment, the pump and shaft gears 54, 50 are bevel gears, for example.

Without departing from the scope of the present invention, the hydraulic pump 24 could also be mounted such that the input shaft 56 and the shaft extension 40 are positioned at a relative different angle with respect to one another. For example, if the extension and input shafts 40, 56 were mounted parallel to each other, straight gears would be used as the shaft and pump gears 50, 54. Alternatively, the hydraulic pump 24 could be positioned in any direction relative to the assembly casing 22, such as, for example, the hydraulic pump 24 can be coupled beneath the assembly casing 22. Other known gears can be used as the shaft and pump gears 50, 54 as well, e.g., helical gears, spur gears, helical bevel gears, worm gears or any other gears used in drive systems, as will be described further below.

The shaft and pump gears 50, 54 may be removed from the shaft extension 40 and input shaft 56 using the hex screws in order to change the gears 50 and/or 54. Changing the gears 50, 54 can easily change the gear ratio between the shaft extension 40 and the input shaft 56. Such changeability is desirable because various vehicle engines 16 produce various amounts of power and rotational speed. Furthermore, different hydraulically powered accessories will demand different amounts of hydraulic power. Because the gears 50, 54 are easily changeable, gears 50, 54 having appropriate gear ratios for each engine/accessory combination can be used.

Figure 7:
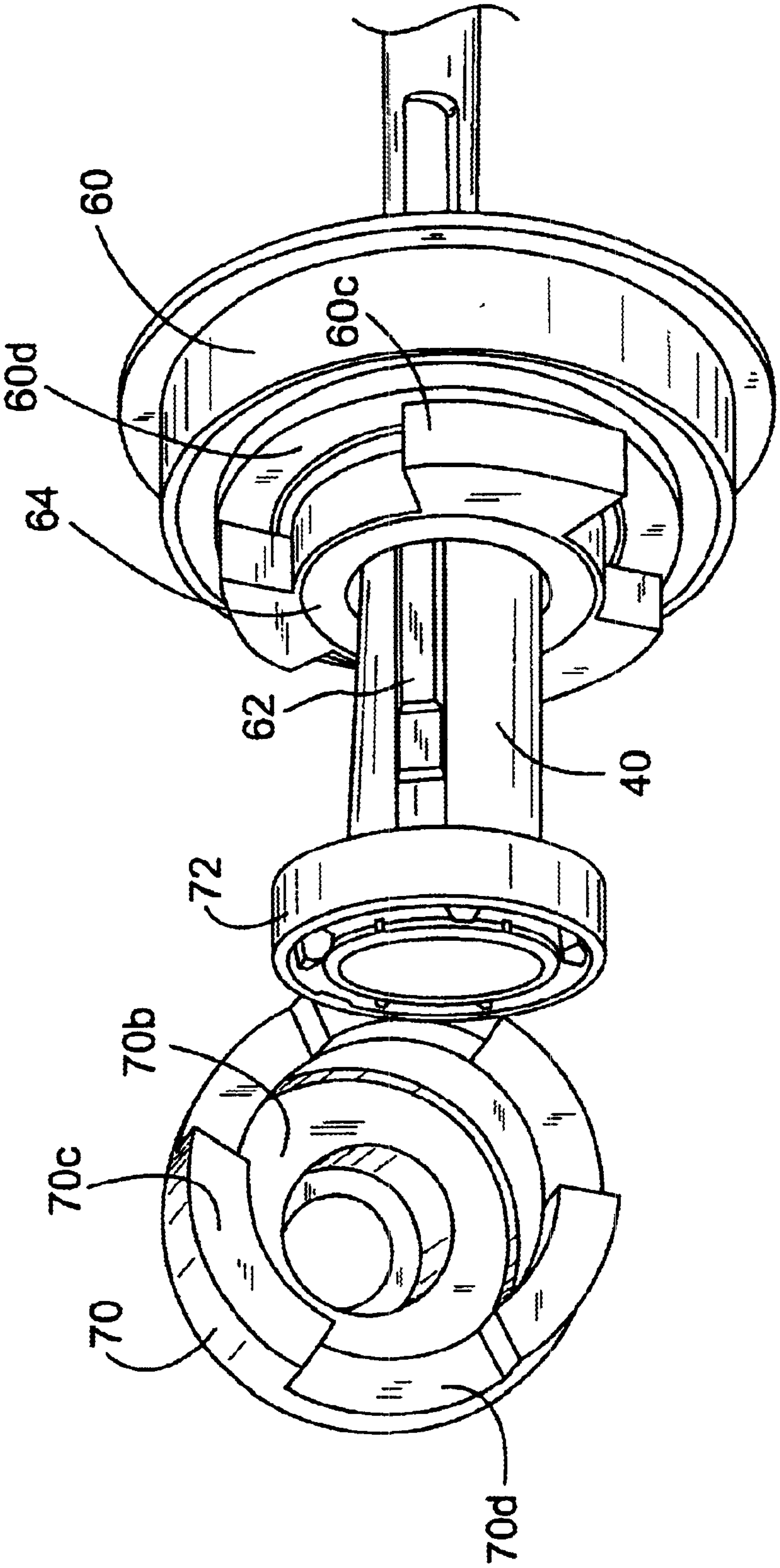
FIGS. 7 and 8 are break away perspective views of a portion of the hydraulic pump unit shown in FIGS. 5 and 6.
Figure 8:
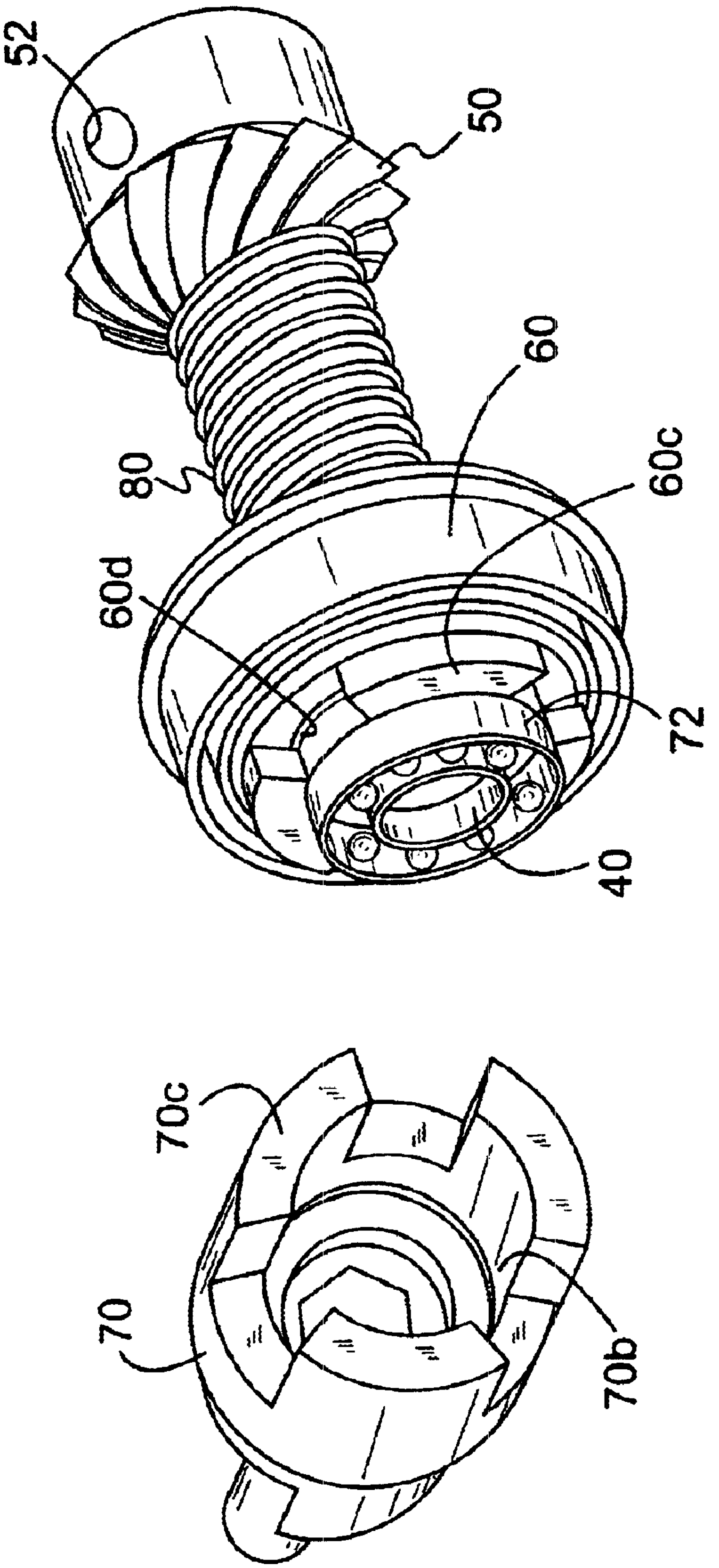

As best seen in FIGS. 5, 7 and 8, the shaft extension 40 and the input shaft 56 are rotationally linked or coupled by a coupler 65 (FIGS. 5–8). The coupler 65 may include a first coupling member 60, a second coupling member 70 and the gears 50, 54, for example.

FIG. 7 shows the coupling member 60 being carried by the shaft extension 40 so as to permit relative axial movement but to prevent relative radial or rotational movement with respect to the shaft 40. To allow relative axial movement, the spline or key 62 is attached to the shaft extension 40, as illustrated in FIG. 7. The first coupling member 60 has a corresponding axially extending key way 64 that fits over the spline or key 62 to prevent the first coupling member 60 from rotating relative to the shaft extension 40 while permitting the first coupling member 60 to move axially relative to the shaft extension 40.

The second coupling member 70 is at least partially carried by the shaft extension 40, as shown in FIGS. 5–8. The second coupling member 70 (FIG. 5) mounts directly to the crankshaft 18 of the engine by, e.g., fastening a threaded portion 70*a* of the second coupling member 70 into a threaded hole (not shown) in the crankshaft 18.

As best seen in FIG. 7, the second coupling member 70 has a recess 70*b* that is configured to fit over a carrying structure 72 mounted onto the end of the shaft extension 40 so as to be carried at least by the shaft extension 40. The carrying structure 72 could be a rotational bearing, a bushing or some other carrying structure. Because the second coupling member 70 is at least partially carried by the shaft extension 40 via the carrying structure 72, the second coupling member 70 is prevented from moving relative to both the shaft extension 40 and the first coupling member 60, for example, in a radial direction. Although the second coupling member 70 is configured to fit over a carrying structure 72 to be partially carried by the shaft extension 40, other ways of mounting the second coupling member 70 to the shaft extension 40 could be used. For example, the second coupling member 70 could be inserted into the first coupling member 60.

As can be seen in FIGS. 5–8, protrusions 60*c,* 70*c* are disposed on the mating surfaces 60*d,* 70*d* of the coupling members 60, 70 such that when the coupling members 60, 70 are pushed against each other, they become rotatably fixed to each other. The protrusions 60*c,* 70*c* in this embodiment are illustrated as three circumferentially spaced protrusions 60*c,* 70*c* on the mating surface 60*d,* 70*d* of the coupling members 60, 70, respectively. Alternatively, any other surface features known in the art that would prevent relative rotation of the coupling members when the mating surfaces 60*d,* 70*d* are pushed against each other could be used as well, such as, for example, joint members or other opposing friction surfaces. The first and second coupling members 60, 70 are sufficiently rigid so that substantially no power is absorbed in the coupling members 60, 70, which increases the available power drawn from the engine 16 by the hydraulic pump unit 20.

FIG. 8 shows a compression spring 80 interposed between the shaft gear 50 and the first coupling member 60. The shaft extension 40 extends through the compression spring 80 to carry the compression spring 80 such that the spring 80 may axially urge the first coupling member 60 toward and into engagement with the second coupling member 70 (FIG. 5).

The first and second coupling members 60, 70 can be selectively coupled to each other using a coupling actuator 140, which is in the form of a moveable fork shown in FIG. 11. The moveable fork 140 can be mounted to the assembly casing 22, for example, the moveable fork 140 can be pivotally connected to a connecting member 141 coupled to the assembly casing 22 by pivot pin 143. The connecting member 141 could also extend from or be integral with the assembly casing 22.

A moveable rod 142 can be connected to one end 144 of the moveable fork 140. As shown in FIG. 11, the moveable rod 142 can extend through a hole 92 (FIGS. 5 and 11) formed in the assembly casing 22. Another end 146 of the fork 140 is disposed substantially perpendicular to the one end 144. As illustrated, the other end 146 is operatively connected to the first coupling member 60 such that the position of the fork 140 determines the axial position of the first coupling member 60. As a result, the fork 140 determines whether the first coupling member 60 engages the second coupling member 70. In this configuration, the end 146 of the fork 140 is generally U-shaped with a slit 148 formed therein. The U-shaped configuration of the end 146 allows the fork 140 to receive the first coupling member 60. The fork 140 can have any configuration that permits the fork to be operatively connected to the first coupling member 60 such that the position of the fork determines the axial position of the first coupling member 60.

As the moveable rod 142 is moved, e.g., pulled or pushed by a user, the fork 140 pivots about the pivot pin 143 in response to the movement of the rod 142. The pivotal movement of the fork 140 in one direction, for example, when the rod is pushed forward, can position the first coupling member 60 against the bias of the spring 80 (FIG. 5) to cause disengagement of the first and second coupling members 60, 70. In the opposite direction, for example, when the rod 142 is pulled backward, the fork 140 can position the first coupling member 60 such that the spring 80 (FIG. 5) biases the first coupling member 60 to cause engagement of the first and second coupling members 60, 70. Alternatively, the fork 140 could be controlled using a controller, such as a remote switch, that could be operated to determine the position of the fork.

In another alternative coupling actuator, an electromagnet including a magnetic coil could be implemented in the ATV 10 to determine the axial position of the first coupling member 60 and, as a result, whether or not the first coupling member 60 engages the second coupling member 70. For example, when the current flows through the magnetic coil, the electromagnet might be configured to axially urge the first coupling member 60 toward and into engagement with the second coupling member 70. When the current stops flowing through the magnetic coil, the electromagnet might be configured to allow the first coupling member 60 to disengage the second coupling member 70.

Figure 9:
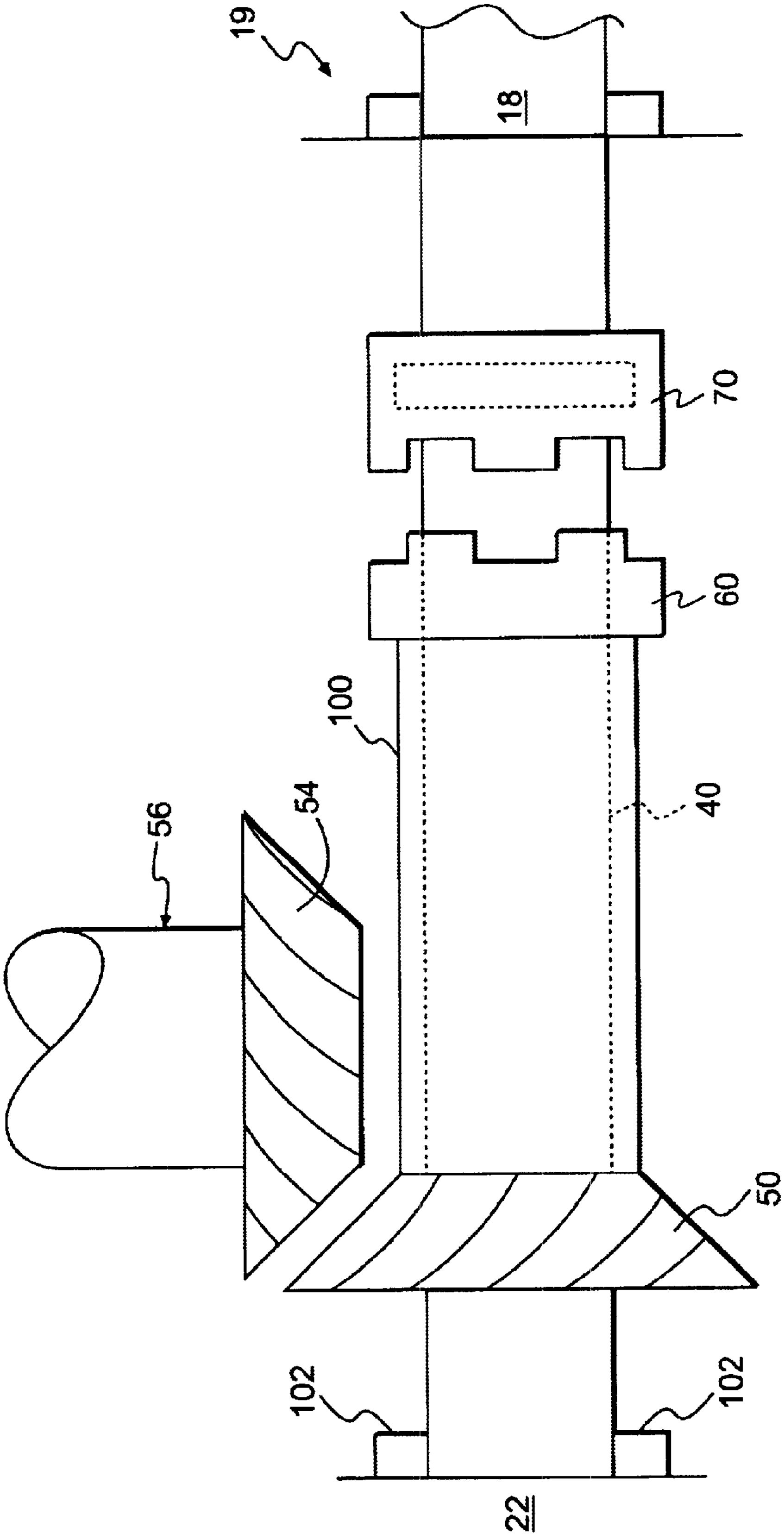
FIG. 9 is a schematic view showing portions of an alternative embodiment of a coupler of the hydraulic pump unit shown in FIGS. 5 and 6.

The coupler 65, as shown in FIGS. 5–8, illustrates one way to couple the shaft extension 40 to the input shaft 56. However, FIG. 9 shows an alternative embodiment in which a tube structure 100 rotatably fixes the first coupling member 60 and the shaft gear 50 instead of having the first coupling member 60 and the shaft gear 50 rotatably fixed to the shaft extension 40. The tube structure 100 may be carried by the shaft extension 40 to permit relative rotation, for example, and the shaft extension 40 could be integral with the crankshaft 18. A spline, such as the spine 62, could be disposed on the tube structure 100 such that the first coupling member 60 would move axially relative to the shaft gear 50. The shaft gear 50 could be axially and rotatably fixed to the tube structure 100.

Apart from the coupling structure 65, the shaft extension 40 could either be fixedly attached to the second coupling member 70 or could be fixedly attached to the assembly casing 22 via carrying structures 102 (FIG. 9), for example, while still carrying the second coupling member 70. The carrying structures 102 could be bearings, bushings or some other carrying structure. FIG. 9 further shows the input shaft 56 positioned generally perpendicular to the shaft extension 40 such that the pump gear 54 and the shaft gear 50 engage one another in intermeshing relation. In FIG. 9, the first coupling member 60 and the second coupling member 70 are carried at least in part by the shaft extension 40 and the input shaft 56 is coupled to the assembly casing 22. The input shaft 56 could also be carried by the assembly casing 22, for example, by carrying structures configured to be substantially identical to the carrying structures 102, such as bearings, bushings or some other carrying structure.

Figure 10:
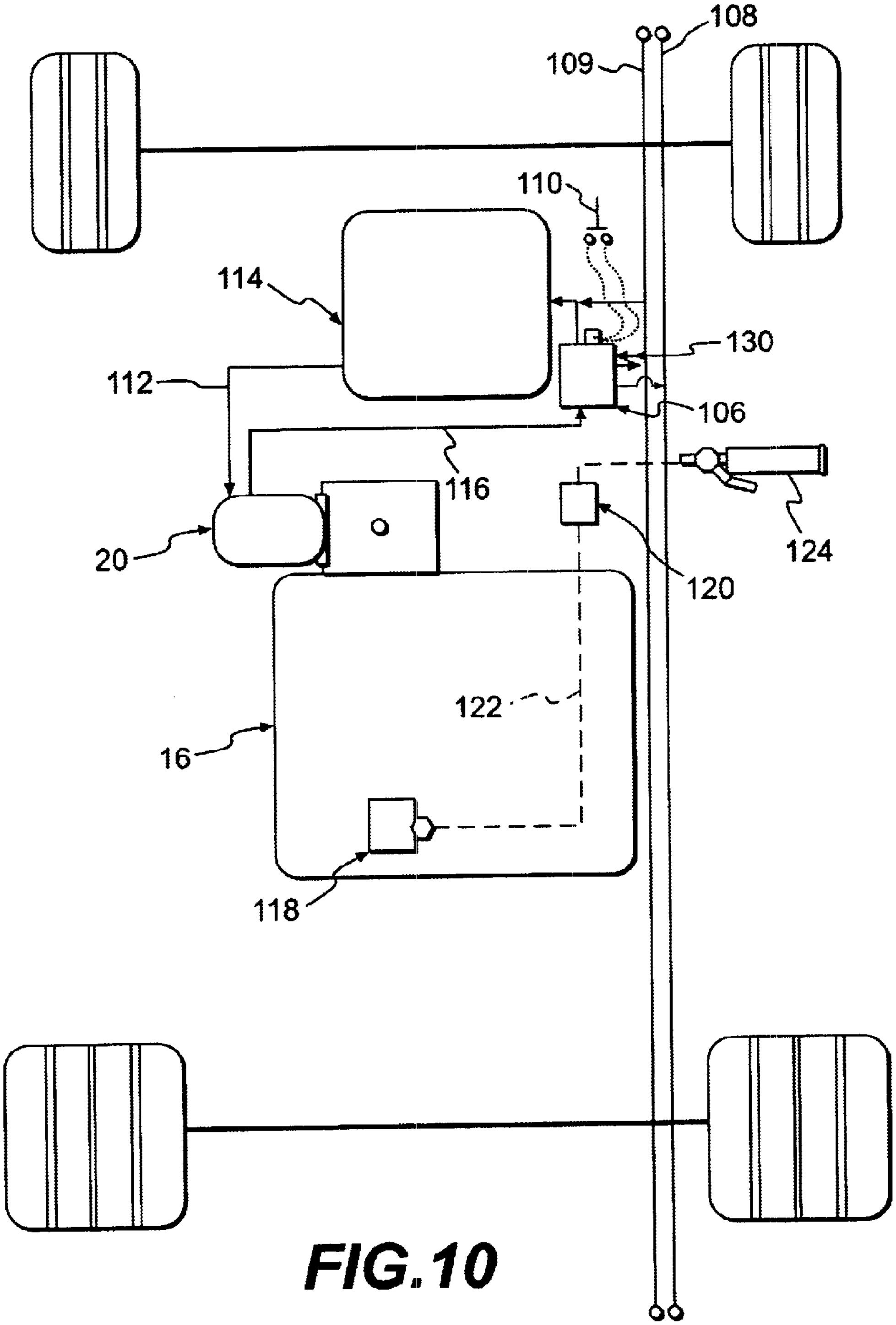
FIG. 10 is a schematic view of a hydraulic circuit including the hydraulic pump unit shown in FIGS. 5 and 6.
Figure 11:
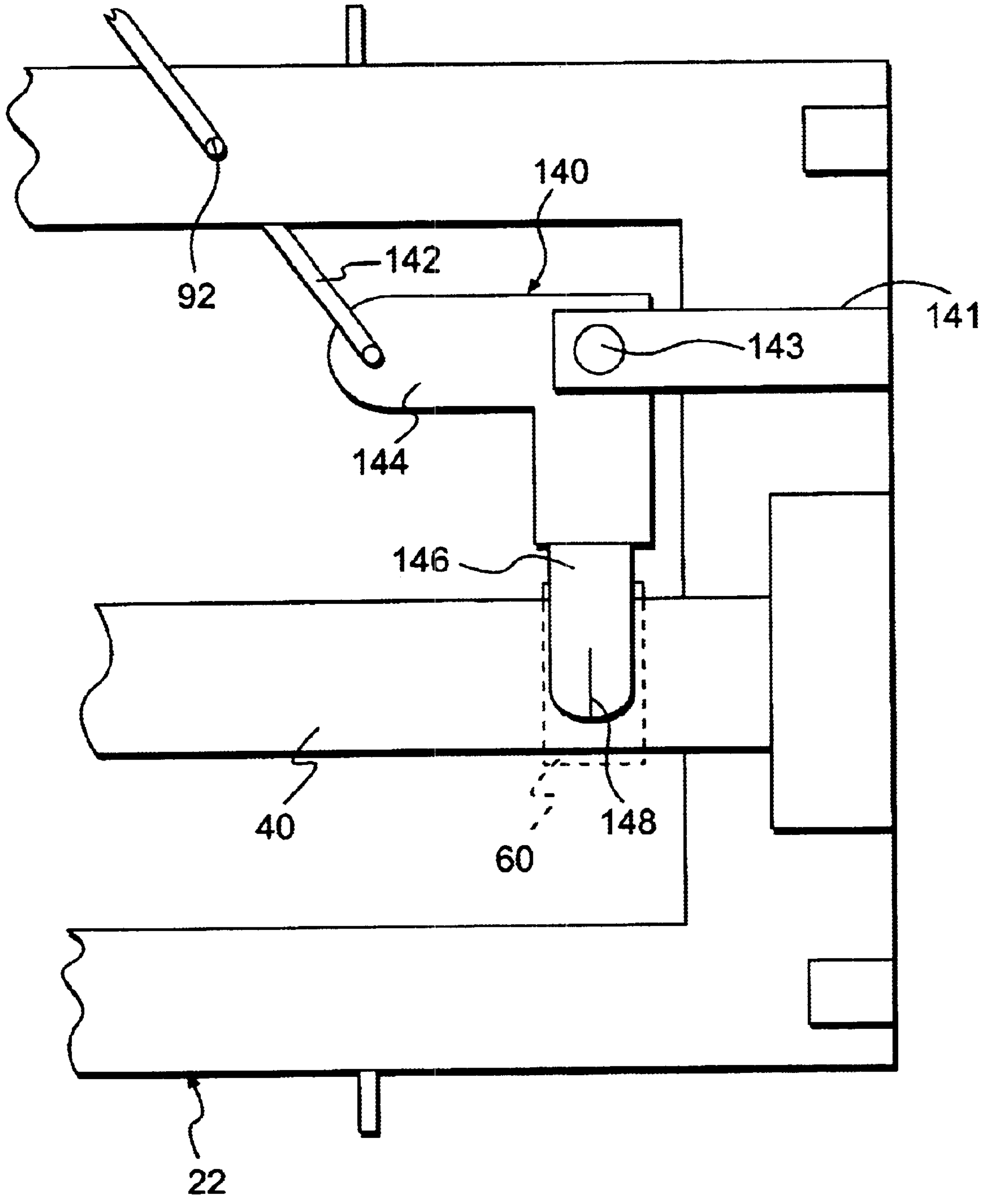
FIG. 11 is a side view of a fork coupled to a portion of the hydraulic pump unit shown in FIGS. 5 and 6.

FIG. 10 shows a hydraulic circuit of the ATV 10 in which the hydraulic pump unit 20 is mounted to the ATV 10, for example, by being coupled to the engine 16 thereof. The hydraulic circuit can be employed, for example, after the first and second coupling members 60, 70 engage one another, by actuating a solenoid valve 106. The solenoid valve 106, which could be a multi-port valve having an additional port 130, is operatively connected to the hydraulic pump unit 20, a hydraulic line 108, and a switch mechanism 110. The switch mechanism 110 may activate the solenoid valve 106. When the solenoid valve 106 is activated or turned on, oil or some other hydraulic fluid is supplied through an oil supply line 112 to the hydraulic pump unit 20 by an oil reservoir 114. The hydraulic pump unit 20 is coupled in fluid communication with the oil reservoir 114 or some other hydraulic fluid reservoir and pumps oil through an oil supply line 116 to the solenoid valve 106. The oil supplied to the solenoid valve 106 from the hydraulic pump unit 20 pressurizes the hydraulic supply line 108. A hydraulic return line 109 is operatively coupled to the solenoid valve 106 and the oil reservoir 114 to complete the hydraulic circuit, i.e., return excess or unused oil to the oil reservoir 114, as is generally known in the art.

A throttle valve 118 is configured to control the rotational speed, e.g., rotations or revolutions per minute (RPM), of the output shaft of the engine 16. The rotational speed of the output shaft of the engine 16 controls, at least in part, the operation of the hydraulic pump unit 20. The throttle valve 118 is electrically coupled to a control unit 120, for example, through a wire 122 or some other electrical connection. The control unit 120 is also electrically coupled to a throttle mechanism 124, such as a handlebar mounted throttle mechanism or a gas pedal of some kind, through the wire 122 from which the control unit 120 receives a signal indicating a selected rotational speed of the engine 16. The control unit 120 may be operatively coupled to an on-board computer (not shown) of the ATV 10, which for example, could help maintain the selected RPM of the engine 16. The computer is one example of a component that is capable of helping the throttle valve 118 maintain the selected RPM of the engine 16, but other components could be used to help the throttle valve 118 maintain the selected RPM of the engine 16 as well.

Although not shown, the solenoid valve 106 and the switching mechanism 110 can be coupled to an additional hydraulic power system or an accessory, for example. The accessory could be, for example, a lawnmower, a snow blower, a snow plow, a lawn mower, a log splitter, a wench or some other suitable hydraulically powered accessory. To facilitate quick attachment and detachment of the additional hydraulic power system, quick release fittings 126, 128 (FIG. 1) can be provided on at least one end of the hydraulic lines 108, 109. The quick release fittings 126, 128, for example, may be designed to attach to the additional hydraulic power system of an accessory, for example.

Oil or other hydraulic fluid continuously flows through the hydraulic circuit shown in FIG. 10 and described above when the first coupling member 60 engages with the second coupling member 70 and when the solenoid valve 106 is activated. However, if the first and second coupling members 60, 70 become disengaged, hydraulic fluid, such as oil, does not continuously flow through the hydraulic circuit due to its temperature characteristics, for example. Thus, the first and second coupling members 60, 70 could be formed into an integral or inseparable configuration or another coupling structure could be used so that continuous flow of the hydraulic fluid through the hydraulic circuit shown in FIG. 10 can be effected.

Hereinafter, the operation of the hydraulic pump unit 20 according to the present invention will be described.

As stated above, movement of the rod 142 in one direction, e.g., being pulled or pushed by a user, can cause movement of the fork 140, which in turn, can cause the first coupling member 60 to engage the second coupling member 70. When the coupling members 60, 70 engage, rotation of the crankshaft 18 is transferred through the coupling members 60, 70 to the shaft extension 40, which transfers the rotation to the input shaft 56 of the hydraulic pump 24 via the gears 50, 54. The pump 24 discharges hydraulic fluid and the hydraulic fluid flows through a hydraulic circuit, e.g., the hydraulic circuit shown in FIG. 10.

When the fork 140 is positioned such that first coupling member 60 is shifted axially away from the second coupling member 70. As a result, rotation of the crankshaft 18 will not be transferred from the second coupling member 70 to the first coupling member 60 and hydraulic power will not be provided to a hydraulically powered accessory, for example.

A method of retrofitting the hydraulic pump unit 20 onto the ATV 10 will be described below. A user may remove at least a portion of an auxiliary starter of the ATV 10 to expose an output shaft of the power unit, e.g., the crankshaft 18 of the engine 16. Thereafter, the user may couple a hydraulic pump unit, such as the hydraulic pump unit 20, to the output shaft or crankshaft 18 of the ATV 10. For example, the user may couple the shaft extension 40 and the crankshaft 18 with at least partial common support such that relative radial movement therebetween is substantially eliminated. Other methods may be used to couple the hydraulic pump unit 20 to the ATV 10 as well.

While the principles of the invention have been made clear in the illustrative embodiments set forth above, it will be obvious to those skilled in the art to make various modifications to the structure, arrangement, proportion, elements, materials, and components used in the practice of the invention.

For example, the shaft extension 40 and the input shaft 56 can be mounted to the ATV 10 in various ways, as shown in reference to FIGS. 9 and 12–14, and other shaft arrangements and embodiments of the coupler 65 will be described below. In the descriptions of the further embodiments, only the points of difference of each embodiment from the first embodiment will be described. That is, in those embodiments, the constituent parts the same as those in the first embodiment are referenced correspondingly in the drawings and the description about them will be omitted.

As mentioned above and best shown in FIG. 9, the carrying structures 102 can fixedly attach the shaft extension 40 to the assembly casing 22 to carry and support the shaft extension 40. The carrying structures 102 can be positioned anywhere on the assembly casing 22 or may be positioned elsewhere on the ATV 10 to support the shaft extension 40 or to carry the shaft extension 40, for example.

Figure 12:
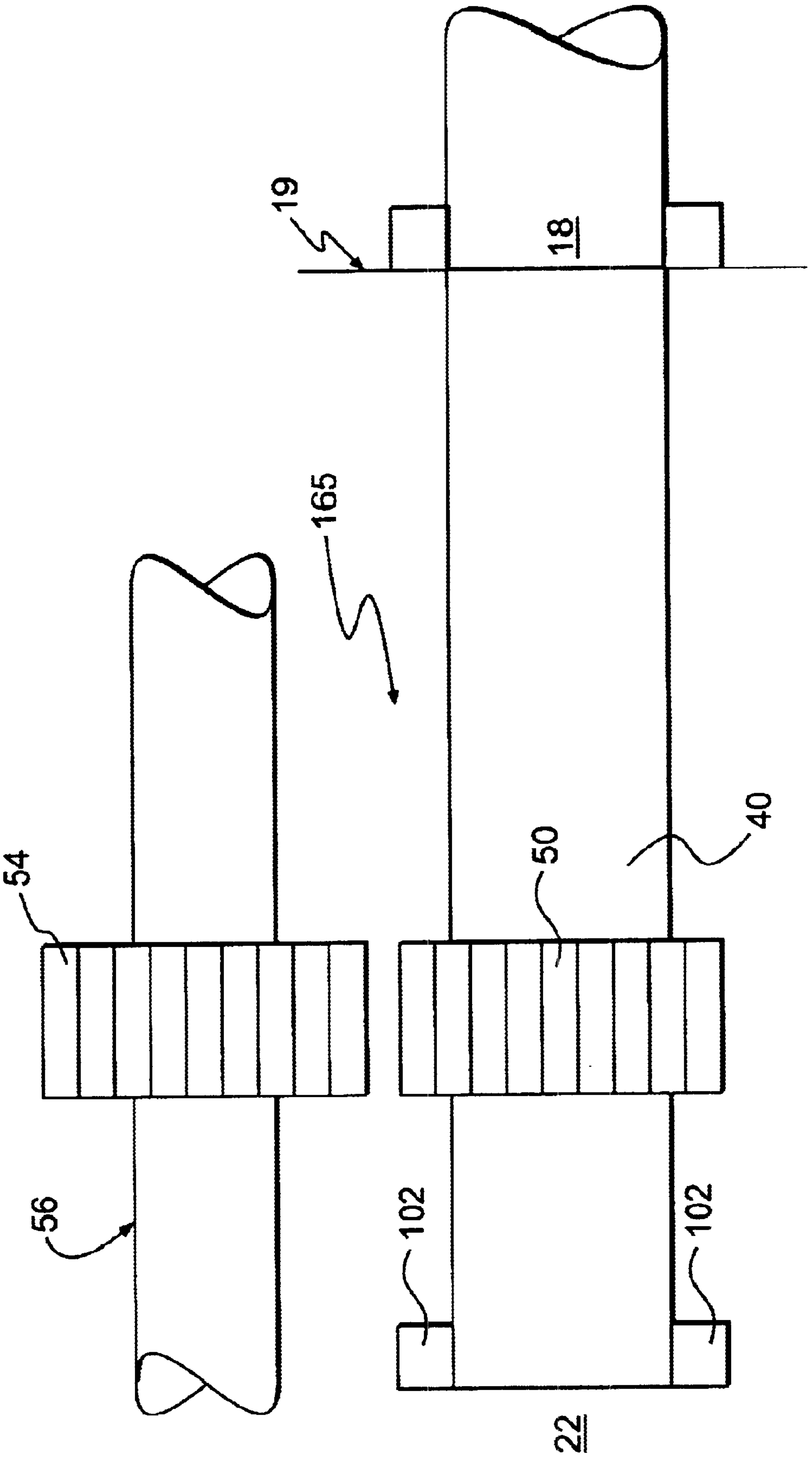
FIGS. 12–14 are schematic views showing portions of alternative gearing/shaft arrangements and embodiments of the coupler for the hydraulic pump unit shown in FIGS. 5 and 6.
Figure 13:
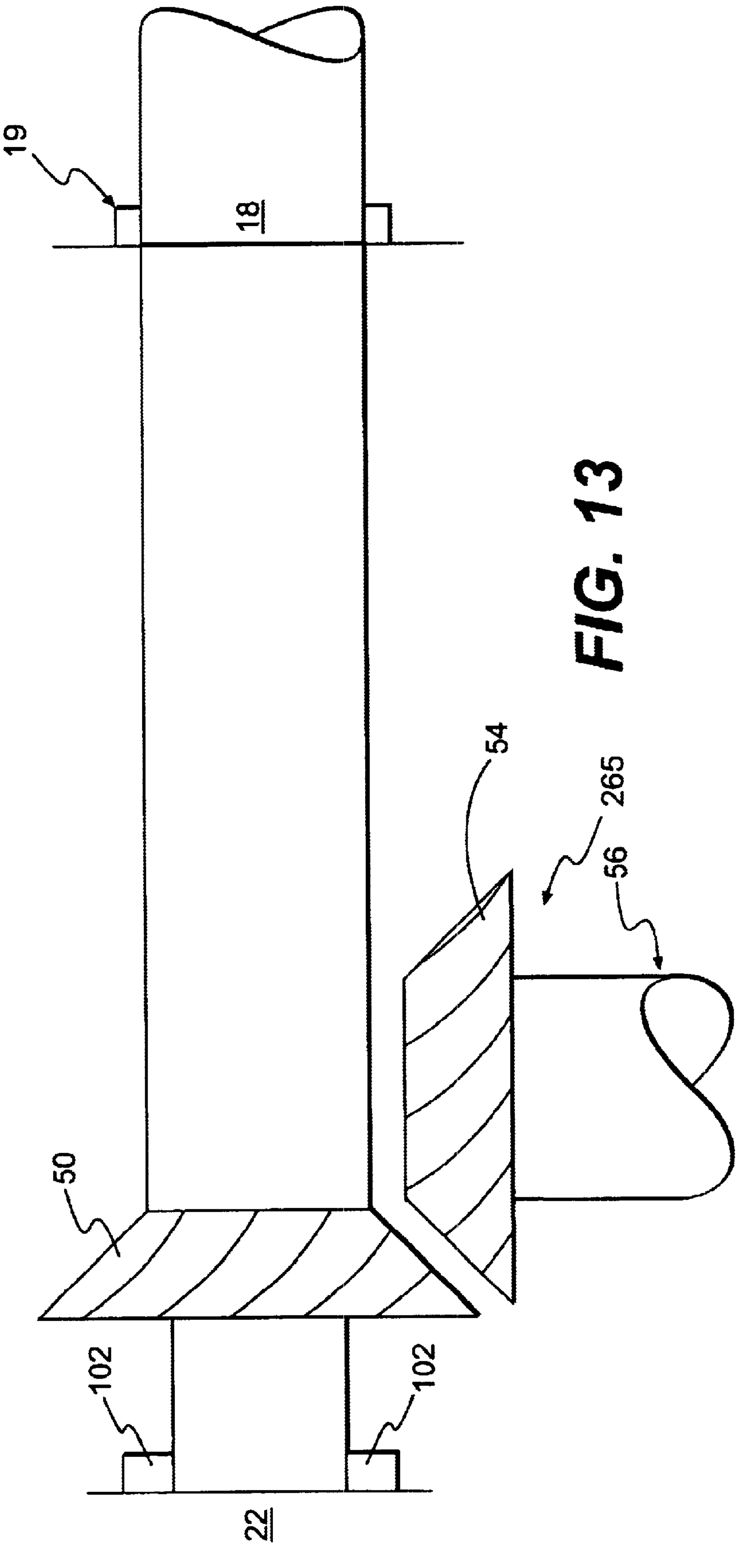
Figure 14:
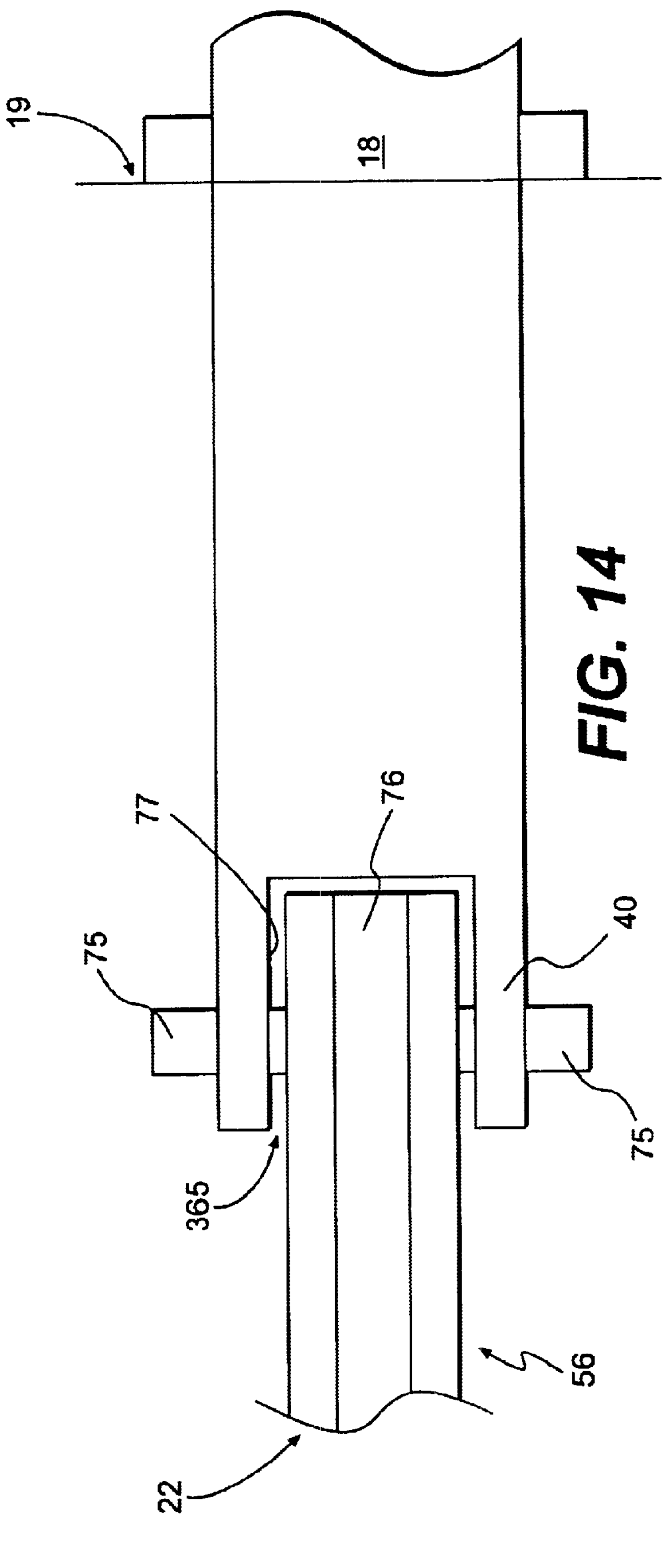

FIGS. 12–14 show the shaft extension 40 integrally formed with the crankshaft 18 so that the shaft extension 40 rotates with the crankshaft 18. Alternatively, the shaft extension 40 could be co-extensive with the crankshaft 18. FIG. 12 shows a coupling structure or coupler 165 in which the input shaft 56 is positioned generally parallel to the shaft extension 40 such that the pump gear 54 and the shaft gear 50 engage one another in intermeshing relation. In this embodiment, the shaft gear 50 and the pump gear 54 can be straight gears, as mentioned above.

Alternatively, FIG. 13 shows a coupling structure or coupler 265 in which the shaft extension 40 is coupled to the assembly casing 22. The input shaft 56 is positioned generally perpendicular to the shaft extension 40 such that the pump gear 54 and the shaft gear 50 engage one another in intermeshing relation.

FIG. 14 shows a coupling structure or coupler 365 in the form of an allen key assembly. The allen key assembly couples the shaft extension 40 to the input shaft 56. The input shaft 56 is positioned coaxially with the shaft extension 40. One end 76 of the input shaft 56 is received within a recessed portion 77 of the shaft extension 40. Carrying structures 75 couple the input shaft 56 to the shaft extension 40 to allow the input shaft 56 and the shaft extension 40 to rotate together, for example. The carrying structures 75, such as, bearings, bushings or other carrying structures, can be integrally formed with one another in the form of a connecting rod, for example.

It will thus be seen that the stated and other objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the disclosure.

What is claimed is:

1. An all-terrain vehicle (ATV) comprising:

a frame;

a power unit mounted on the frame for propulsion of the ATV, the power unit having an output shaft and a mounting structure;

a hydraulic pump unit comprising an assembly casing mounted to the mounting structure of the power unit, a hydraulic pump mounted to the assembly casing, the hydraulic pump having a rotatable input shaft, a shaft extension selectively coupled to the output shaft and carried by the assembly casing so as to be coaxial with the output shaft; and a coupler, coupling the shaft extension to the input shaft, comprising a first coupling member carried by the shaft extension, the first coupling member being rotationally linked to the input shaft of the hydraulic pump such that rotating the first coupling member forces the input shaft to rotate, and a second coupling member selectively coupleable to the first coupling member and being rotatably fixed to the output shaft, the second coupling member being at least partially carried by the shaft extension.

2. The ATV of claim 1, further comprising a protrusion disposed on each of corresponding mating surfaces of the first and second coupling members such that when the coupling members are axially pushed against each other, they become rotatably fixed to each other.

3. The ATV of claim 1, wherein the first coupling member is rotationally linked to the input shaft with a rotational linkage, the rotational linkage between the input shaft and the first coupling member comprises:

a shaft gear carried by the shaft extension, the shaft gear being rotationally fixed to the first coupling member; and a pump gear rotatably fixed to the input shaft of the hydraulic pump, the pump gear meshing with the shaft gear.

4. The ATV of claim 3, wherein the shaft gear and the first coupling member are each rotatably fixed to the shaft extension such that the shaft gear and first coupling member are rotatably fixed to each other.

5. The ATV of claim 3, wherein the shaft gear and the first coupling member rotate independently from the shaft extension.

6. The ATV of claim 3, wherein the shaft extension and input shaft are parallel.

7. The ATV of claim 3, wherein the shaft extension is perpendicular to the input shaft and the shaft gear and the pump gear are mating bevel gears.

8. The ATV of claim 3, wherein the shaft and pump gears are removable so as to facilitate changing a gear ratio between the shaft extension and the hydraulic pump by changing the shaft and pump gears.

9. The ATV of claim 1, wherein the second coupling member is at least partially carried by the shaft extension via a carrying structure disposed between the second coupling member and the shaft extension.

10. The ATV of claim 1, further comprising a compression spring carried by the shaft extension, the compression spring urging the first coupling member into engagement with the second coupling member.

11. The ATV of claim 1, further comprising a coupling actuator provided to the hydraulic pump unit for selectively coupling the first coupling member to the second coupling member.

12. The ATV of claim 1, wherein the coupler includes a gear assembly.

13. The ATV of claim 1, wherein the input shaft is carried by the assembly casing.

14. The ATV of claim 1, wherein the mounting structure of the power unit is designed to accommodate a mounting of an auxiliary starter.

15. The ATV of claim 1, further comprising a bearing coupled to the assembly casing and configured to carry the shaft extension.

16. The ATV of claim 1, wherein the assembly casing is positioned external to the power unit.

17. A hydraulic pump unit comprising:

an assembly casing adapted to be removably mounted to a power unit mounting structure;

a hydraulic pump mounted to the assembly casing, the hydraulic pump having a rotatable input shaft;

a shaft extension carried by the assembly casing and adapted to be coaxial with an output shaft of a power unit;

a coupler, coupling the shaft extension to the input shaft, comprising a first coupling member carried by the shaft extension, the first coupling member being rotationally linked to the input shaft of the hydraulic pump such that rotating the first coupling member forces the input shaft to rotate, and a second coupling member selectively coupleable to the first coupling member and adapted to be rotatably fixable to the output shaft, the second coupling member being at least partially carried by the shaft extension; and a rotational linkage, linking the first coupling member to the input shaft, comprising a shaft gear carried by the shaft extension, the shaft gear being rotationally fixed to the first coupling member, and a pump gear rotatably fixed to the input shaft of the hydraulic pump, the pump gear meshing with the shaft gear, wherein the shaft gear and the first coupling member are each rotatably fixed to the shaft extension such that the shaft gear and first coupling member are rotatably fixed to each other.

18. The hydraulic pump unit of claim 17, further comprising a protrusion disposed on each of corresponding mating surfaces of the first and second coupling members such that when the coupling members are axially pushed against each other, they become rotatably fixed to each other.

19. The hydraulic pump unit of claim 17, wherein the shaft extension and the input shaft are parallel.

20. The hydraulic pump unit of claim 17, wherein the shaft extension is perpendicular to the input shaft and the shaft gear and the pump gear are mating bevel gears.

21. The hydraulic pump unit of claim 17, wherein the shaft and pump gears are removable so as to facilitate changing a gear ratio between the shaft extension and the hydraulic pump by changing the shaft and pump gears.

22. The hydraulic pump unit of claim 17, wherein the second coupling member is at least partially carried by the shaft extension via a carrying structure disposed between the second coupling member and the shaft extension.

23. The hydraulic pump unit of claim 17, further comprising a compression spring carried by the shaft extension, the compression spring urging the first coupling member into engagement with the second coupling member.

24. The hydraulic pump unit of claim 17, further comprising a coupling actuator provided to the hydraulic pump unit for selectively coupling the first coupling member to the second coupling member.

25. The hydraulic pump unit of claim 17, wherein the shaft extension is formed in one piece with the output shaft.

26. The hydraulic pump unit of claim 17, wherein the input shaft is carried by the assembly casing.

27. The hydraulic pump unit of claim 17, further comprising a bearing coupled to the assembly casing and configured to carry the shaft extension.

28. The hydraulic pump unit of claim 17, wherein the assembly casing is adapted to be positioned external to the power unit.

29. A hydraulic pump unit comprising:

a shaft extension provided with a first gear; and a hydraulic pump having an input shaft provided with a second gear that is operatively connected with the first gear, wherein the shaft extension and input shaft are positioned perpendicular to one another, and wherein the first and second gears are mating bevel gears.

30. The hydraulic pump unit of claim 29, further comprising a casing carrying the shaft extension so that the shaft extension is adapted to be coaxial with an output shaft of a power unit.

31. The hydraulic pump unit of claim 29, wherein the second gear meshes with the first gear.

32. The hydraulic pump unit of claim 29, further comprising:

a first coupling member supported on the shaft extension; and a second coupling member having a first end attachable to an engine crankshaft and a second end that is selectively coupleable with the first coupling member, the second coupling member being at least partially supported on the shaft extension.

33. The hydraulic pump unit of claim 29, wherein the hydraulic pump unit is adapted to be retrofit onto an all-terrain vehicle (ATV) having a power unit.

34. The hydraulic pump unit of claim 29, wherein the hydraulic pump unit is adapted to be retrofit onto an all-terrain vehicle (ATV) having an output shaft.

35. The hydraulic pump unit of claim 34, where in the shaft extension is formed in one piece with the output shaft of the ATV.

36. A method of retrofitting a hydraulic pump unit onto an all-terrain vehicle (ATV) having a power unit with an output shaft and a mounting structure, the method comprising:

providing a hydraulic pump unit, the hydraulic pump unit comprising an assembly casing adapted to be mounted to the power unit of the ATV, a hydraulic pump mounted to the assembly casing and having a rotatable input shaft, a shaft extension adapted to be coupled to the output shaft and carried by the assembly casing so as to be coaxial with the output shaft, and a coupler coupling the shaft extension to the input shaft, the coupler comprising a first coupling member carried by the shaft extension, the first coupling member being rotationally linked to the input shaft of the hydraulic pump such that rotating the first coupling member forces the input shaft to rotate, and a second coupling member selectively coupleable to the first coupling member and adapted to be rotatably fixable to the output shaft, the second coupling member being at least partially carried by the shaft extension, wherein the first coupling member is rotationally linked to the input shaft with a rotational linkage, the rotational linkage between the input shaft and the first coupling member comprising a shaft gear carried by the shaft extension, the shaft gear being rotationally fixed to the first coupling member, and a pump gear rotatably fixed to the input shaft of the hydraulic pump, the pump gear meshing with the shaft gear, wherein the shaft gear and the first coupling member are each rotatably fixed to the shaft extension such that the shaft gear and first coupling member are rotatably fixed to each other; and mounting the hydraulic pump unit to the mounting structure of the ATV.

37. The method of claim 36, wherein the shaft extension is perpendicular to the input shaft and the shaft gear and the pump gear are mating bevel gears.

* * * * *